United States Patent
Hutchings et al.

(10) Patent No.: US 8,639,226 B2
(45) Date of Patent: Jan. 28, 2014

(54) WEIGHING DEVICE AND METHOD

(75) Inventors: Cédric Hutchings, Issy les Moulineaux (FR); Eric Carreel, Meudon (FR)

(73) Assignee: Withings, Issey les Moulineaux (FR)

(*) Notice: Subject to any disclaimer, the term of this patent is extended or adjusted under 35 U.S.C. 154(b) by 19 days.

(21) Appl. No.: 13/264,911

(22) PCT Filed: Mar. 31, 2010

(86) PCT No.: PCT/FR2010/050616
§ 371 (c)(1),
(2), (4) Date: Feb. 2, 2012

(87) PCT Pub. No.: WO2010/122252
PCT Pub. Date: Oct. 28, 2010

(65) Prior Publication Data
US 2012/0122430 A1    May 17, 2012

(30) Foreign Application Priority Data
Apr. 21, 2009 (FR) .................. 09 52613

(51) Int. Cl.
*H04M 3/42* (2006.01)
(52) U.S. Cl.
USPC .......... 455/414.1; 455/414.2; 455/556.1; 455/556.2; 455/557; 455/41.2
(58) Field of Classification Search
USPC .......... 455/414.1, 414.2, 556.1, 556.2, 557, 455/41.2
See application file for complete search history.

(56) References Cited

U.S. PATENT DOCUMENTS

| 5,878,376 | A * | 3/1999 | Schurr .................. 702/102 |
| 6,781,067 | B2 | 8/2004 | Montagnino et al. |
| 7,872,201 | B1 * | 1/2011 | Whitney .................. 177/25.13 |
| 2007/0073558 | A1 | 3/2007 | Hall et al. |
| 2008/0154645 | A1 * | 6/2008 | Takehara .................. 705/3 |
| 2009/0081951 | A1 * | 3/2009 | Erdmann et al. .......... 455/41.2 |
| 2012/0191147 | A1 * | 7/2012 | Rao et al. .................. 607/3 |

FOREIGN PATENT DOCUMENTS

| EP | 1 239 268 A1 | 9/2002 |
| WO | WO-2007/102708 A1 | 9/2007 |

OTHER PUBLICATIONS

International Search Report and Written Opinion for related International Application No. PCT/FR2010/050616; report dated Aug. 5, 2010.
Preliminary Search Report and Written Opinion for related French application Serial No. FR 09 52613; report dated Jan. 27, 2010.

* cited by examiner

*Primary Examiner* — Barry Taylor
(74) *Attorney, Agent, or Firm* — Miller, Matthias & Hull LLP (57) ABSTRACT

The invention relates to a method for weighing a use located on an electronic scale in communication with a mobile telecommunication terminal having a display screen, the scale and the mobile terminal both wirelessly communicating with a telecommunication network adapted to put at least the mobile terminal in communication with an additional communication device, the method including a weighing step, a two-way communication step during which the scale transmits weighing data resulting from the weighing to the mobile terminal, and a display step during which the mobile terminal displays weighing data on the screen.

25 Claims, 3 Drawing Sheets

FIG. 5

WEIGHING DEVICE AND METHOD

CROSS-REFERENCE TO RELATED APPLICATIONS

This application is a U.S. national stage filing of International Patent Application No. PCT/FR2010/050616 filed on Mar. 31, 2010, which claims priority under the Paris Convention to French Patent Application No. 09 52613, filed on Apr. 21, 2009.

FIELD OF THE DISCLOSURE

The invention relates to weighing devices and methods.

BACKGROUND OF THE DISCLOSURE

It more particularly relates to the field of electronic body scales. These devices have become more and more sophisticated. As an example, certain models have impedance measurement functions, which allow measuring not only the weight of the user, but also other parameters such as the body fat percentage, muscle mass percentage, body water percentage, body mass index, etc. This sophistication leads to complexity in the display and control buttons for the scale, which is impractical because the scale is placed on the ground.

To improve the ergonomics of body scales, weighing devices can be used in which the scale has a wireless connection to a remote user interface. It is this type of scale that is a particular object of the invention.

U.S. Pat. No. 6,781,067 describes an example of such a scale, in which the interface is a specific device attached to the wall, which communicates with the scale via a dedicated one-way link.

SUMMARY OF THE DISCLOSURE

One goal of the invention is to improve scales of this type, in particular by improving the ergonomics.

To that end, the invention proposes a weighing method using an electronic body scale communicating with a mobile telecommunication terminal equipped with a display screen, the scale and the mobile terminal both communicating by Hertzian waves with a telecommunication network, said telecommunication network being adapted to place at least the mobile terminal in communication with at least one supplemental telecommunication device, the method comprising the following steps:

(a) at least one weighing step during which the scale obtains at least one measurement representative of at least the weight of the user, (b) at least one bidirectional communication step, during which:
  a user enters data into the mobile terminal, and the mobile terminal transmits said information to the scale by means of the telecommunication network,
  the scale transmits weighing data regarding said measurement, to the mobile terminal, over the telecommunication network, (c) and at least one display step during which the mobile terminal displays, on the screen, information regarding the weighing data transmitted in the communication step.

These arrangements make use of the preexisting and very rich functionalities of the user interface of the mobile terminal, and the preexisting communication capabilities of the mobile terminal are also exploited. A lower cost weighing method is thus obtained which is particularly ergonomic for the user. One will note that communication of data to the scale is not necessary each time the scale is used by the same user; on the contrary, this communication may possibly be limited to an initial configuration step which a given user only performs once when he first uses the scale, or once from time to time.

In addition, considering the possibilities for communication offered by the telecommunication network, the method of the invention makes it possible to access external resources, particularly in order to enrich the functionalities offered to the user or to enrich the weighing data presented to the user during weighing or at a later time.

In some embodiments of the method of the invention, one or more of the following arrangements may be used:

during the weighing step (a), a bioelectrical impedance measurement is also obtained for the user, and during the communication step, the data entered by the user into the mobile terminal comprise a user profile and the weighing data transmitted by the scale to the mobile terminal comprise a weight and impedance data regarding the user profile;

the user profile comprises the age, height, and gender of the user, said telecommunication network comprises a wide area network, and during the communication step said weighing data are transmitted to a server over said wide area network, during the communication step, the scale transmits said weighing data regarding said measurement to the mobile terminal, in real time over the telecommunication network, and during the display step (d) the mobile terminal displays in real time on the screen, while the user is on the scale, said information regarding the weighing data transmitted in the upload communication step, the mobile terminal used is a mobile telephone, the telecommunication network comprises at least one wireless local area network to which the scale belongs, and during the communication step the scale transmits said weighing data to the mobile terminal by means of said wireless local area network, said wireless local area network uses a communication protocol selected from among the WIFI and BLUETOOTH protocols, the mobile terminal also belongs to the wireless local area network, and during the communication step the scale transmits said weighing data to the mobile terminal solely by means of said wireless local area network, the local area network additionally comprises a platform which communicates with at least the scale, and during the communication step, the scale transmits said weighing data to the mobile terminal by means of the platform, said telecommunication network additionally comprises a wide area network distinct from the wireless local area network, the platform communicating with at least one server by means of said wide area network, the mobile terminal also communicating with said server by means of the wide area network, and during the communication step the scale transmits said weighing data to the mobile terminal by means of said server, over said wide area network, during the communication step, the server transmits supplemental information to the mobile terminal in addition to said weighing data, over said wide area network, during the communication step, the server communicates with the mobile terminal by means of the platform, during the communication step, the server communicates with the mobile terminal directly over the wide area network without passing through the platform, the communication step comprises a bidirectional communication between the scale and the mobile terminal, during the weighing step, the scale automatically attempts to establish a correspondence between the user and at least one predetermined user profile in order to determine said weighing data using at least one predetermined rule dependent on the user profile, and during the communication step, if the user is not a regular user of the scale, said user is identified as a guest on the mobile terminal and the scale then stops automatically attempting to establish a correspondence between the user and a predetermined user profile, if said user is identified as a guest on the mobile terminal, then the mobile terminal asks the user to select a user profile from a preexisting list, and after a user profile is selected this profile is sent to the scale in order to determine said weighing data using at least one predetermined rule dependent on the selected user profile, the scale used comprises a screen, and the method has a preliminary association step during which a code is displayed on the screen of the scale, the user enters said code into an input interface which is part of the mobile terminal, then said code is sent by the scale to the server by means of the platform and the code entered into the input interface is sent by the mobile terminal to said server, after which the server checks if the code received from the scale corresponds to the code received from the mobile terminal, and if there is a correspondence, the server associates the scale with the mobile terminal in the wireless local area network, at least one updating step, during which the server updates software in the scale, the weighing data comprise the user's weight, calculated using at least one user weight calculation parameter based on said measurement representative of the user's weight during the measurement step, and during said updating step, the server determines the geographical location of the scale using geolocation functionalities of the wide area network, and updates said user weight calculation parameter as a function of said geographical location, the weighing data comprise the weight of the user, calculated using at least one user weight calculation parameter based on said measurement representative of the user's weight during the measurement step, said measurement representative of the user's weight being obtained by at least one strain gauge which is part of the scale, and during said updating step the server updates said user weight calculation parameter as a function of statistical data relating to the scales in service, the weighing data comprise bioelectrical impedance data calculated from impedance measurements made by the scale, using at least one predetermined calculation rule, and the server updates said calculation rule during said updating step, the weighing data obtained during the measurement step are time-stamped, and the method comprises a time reset step during which an internal clock which is part of the scale is updated using time setting functionalities available on said telecommunication network, during the measurement step, the scale performs a number n of measurements by n strain gauges which are part of said scale, and the weighing data comprise the weight of the user, calculated using a predetermined relation as a function of the n measurements from the strain gauges, said method comprising a calibration step during which a known weight is successively placed at least n times on the scale in n different respective locations, storing the n measurements from the strain gauges each time, and then said predetermined relation is determined based on the measurements made in this manner.

Another object of the invention is a weighing device comprising:

an electronic scale (1) adapted to provide at least one measurement representative of at least the weight of a user (U) positioned on said scale, a mobile telecommunication terminal (2) equipped with a display screen, said scale and said mobile terminal both communicating by Hertzian waves with a telecommunication network adapted to allow at least the mobile terminal to communicate with at least one supplemental telecommunication device, the scale being adapted to transmit weighing data regarding said measurement to the mobile terminal, over the telecommunication network, and the mobile terminal being adapted to:

transmit to the scale, by means of the telecommunication network, data input into the mobile terminal by the user, and display in real time, on the screen, information regarding the weighting data transmitted by the scale.

In some embodiments of the device of the invention, one or more of the following arrangements may be used:

the scale is adapted to obtain a bioelectrical impedance measurement for the user, with the weighing data comprising a weight of the user and bioelectrical impedance data, the mobile terminal being adapted:

to allow the user to enter a user profile, and to transmit this user profile to the scale, said scale being adapted to determine said bioelectrical impedance data as a function of said user profile, the user profile comprises the age, height, and gender of the user, said telecommunication network comprises a wide area network and the scale is adapted to transmit said weighing data to a server over said wide area network, the mobile terminal used is a mobile telephone, the telecommunication network comprises at least one wireless local area network to which the scale belongs, the scale being adapted to transmit said weighing data to the mobile terminal by means of said wireless local area network, said wireless local area network uses a communication protocol selected from among the WIFI and BLUETOOTH protocols, the mobile terminal also belongs to the wireless local area network, and the scale is adapted to transmit said weighing data to the mobile terminal solely by means of said wireless local area network, the local area network additionally comprises a platform which communicates with at least the scale, and said telecommunication network additionally comprises a wide area network distinct from the wireless local area network, said platform communicating with at least one server by means of said wide area network (5), the mobile terminal also communicating with said server by means of the wide area network.

BRIEF DESCRIPTION OF THE DRAWINGS

Other features and advantages of the invention will be apparent from the following description of one of its embodiments, provided as a non-limiting example and referencing the attached drawings.

In the drawings.

DETAILED DESCRIPTION OF THE DISCLOSURE

In the different figures, the same references denote identical or similar elements.

Figure 1:
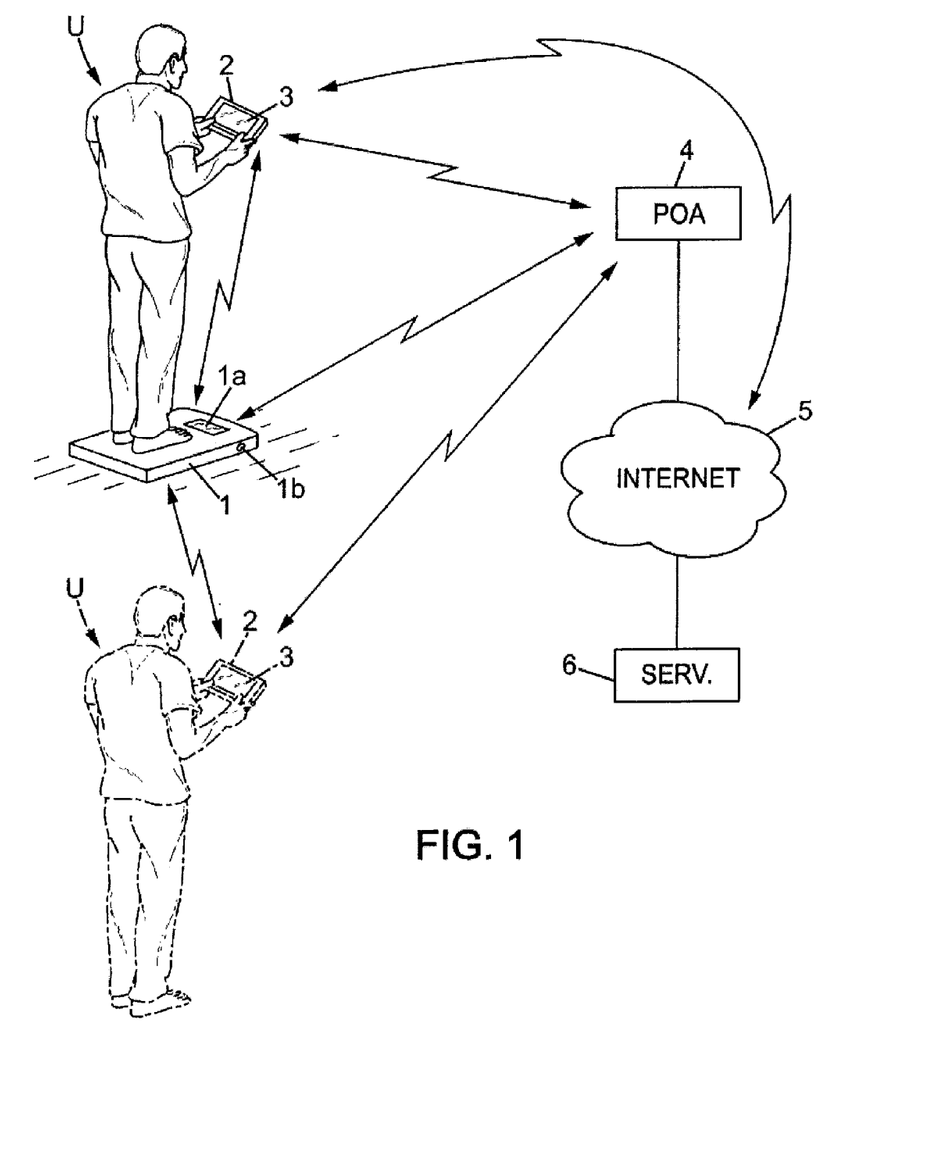
FIG. 1 is a perspective view showing an example of a weighing device according to one embodiment, comprising a scale and a mobile terminal.

FIG. 1 represents an example of a weighing device according to an embodiment of the invention.

In all cases, this weighing device comprises an electronic scale 1 on which a user U may be positioned, particularly in order to measure his weight, and a mobile telecommunication terminal 2 equipped with a screen 3.

The mobile terminal 2 in question may conventionally be a mobile telephone, but may also consist of any other mobile personal device such as a personal data organizer (PDA) or other device having radio communication capabilities.

The scale 1 can be, for example, a bioelectrical impedance scale, adapted not only to measure the weight of the user U, but also to perform impedance measurements via the sole of the user's feet in order to determine parameters such as body fat percentage, muscle mass percentage, body water percentage, body mass index, etc. The scale 1 is equipped with radio communication means.

The mobile terminal 2 can thus communicate bidirectionally with the scale 1 during the weighing of the user U, the scale 1 and the mobile terminal 2 using Hertzian waves to communicate the over same telecommunication network whether the network is homogeneous or heterogeneous.

In the particular example in FIG. 1, said telecommunication network is a heterogeneous network comprising:

a wireless local area network which uses for example the WIFI protocol (IEEE 802.11x standard) or the BLUETOOTH protocol, or some other protocol, and a wide area network, in this case the Internet 5, which is connected to said local area network by a platform 4 (POA) which itself is part of the wireless local area network. The platform 4 may consist of any known gateway operating in a wireless local area network and forming an Internet access point.

The scale 1 and the mobile terminal 2 can thus communicate with at least one remote server 6 by means of the Internet 5.

One will note that the mobile terminal 2 may have functionalities giving it direct access to the Internet, using for example a telephony radio access link (for example a UMTS connection) of the third generation or newer, such that the mobile terminal 2 can access the server 6 where applicable without the intervention of the platform 4.

Figure 2:
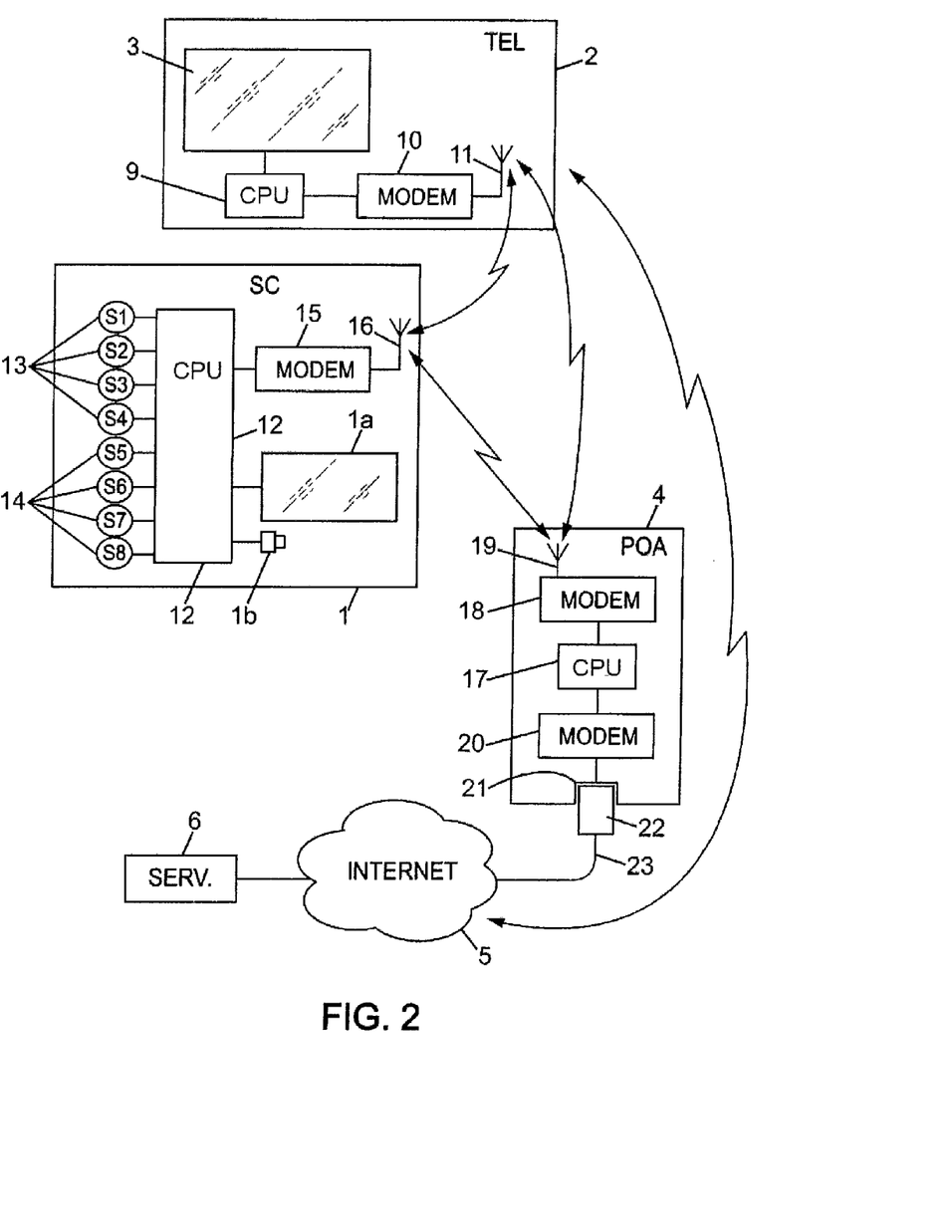
FIG. 2 is a block diagram illustrating certain components which are part of the weighing device in FIG. 1.

As represented in more detail in FIG. 2, the mobile telephone 2 (TEL) may comprise, for example, a central processing unit 9 (CPU) such as a microCPU or similar unit, controlling:

the screen 3, at least one modem 10 connected to at least one radio antenna 11 for communicating either with the wireless local area network (for example in WIFI mode) or directly with the Internet 5 (for example in UMTS mode).

The screen 3 may be a touch screen serving as an input interface, or the mobile terminal may have a separate input terminal such as a keyboard (not represented), which is also connected to the CPU 9.

The scale 1 (SC) comprises a central processing unit 12 (CPU) such as a microCPU or similar unit, which is connected to:

at least one weight sensor 13, for example a number n of weight sensors S1-S4 such as strain gauges, where n is equal to 4 for example, one or more impedance sensors 14 (S5-S8) which can obtain impedance measurements from the soles of the feet of the user U, a modem 15 connected to at least one radio antenna 16 which can communicate with said wireless local area network, if applicable, a display screen 1a, and if applicable, an association button 1b for use as described below.

The platform 4 comprises a central processing unit 17 (CPU) such as a microCPU or similar unit, which is connected to:

a modem 18 adapted to communicate with the wireless local area network by means of an antenna 19, and a supplemental modem 20, for example an ADSL modem, equipped with a jack 21 which accepts the connector 22 of a cable 23 connected to the telephone network for access to the Internet 5.

The device which has just been described may function as follows.

Initial Calibration of the Scale

Before any operation of the scale 1, a calibration step for this scale may first be carried out, either at the factory or at the user's house.

As an example, the CPU 12 of the scale can determine the weight M of the user U during a weighing, as a linear combination of n measurements R1-Rn (n=4 in the example considered here) obtained simultaneously by the n strain gauges 13, respectively multiplied by n calculation parameters α1-αn:

$$M = \alpha 1 \cdot R1 + \alpha 2 \cdot R2 + \ldots + \alpha n \cdot Rn.$$

In this case, one can determine the n parameters for calculating α1-αn by successively positioning a known weight M0 at least n times on the scale 1, in n different respective locations, and storing the n measurements from the strain gauges each time. As the weight M0 is known, at least n equations with n unknowns (the calculation parameters α1-αn) are obtained. Solving this system of linear equations allows the scale's CPU 12 to calculate the n calculation parameters α1-αn.

If this calibration step is performed by the user, said user can be guided in the process by indications given on the screen 1a of the scale, for example.

One will note that, when the calibration step comprises more than n weighings of the predetermined weight M0, this calibration step can also allow verifying that the strain gauges 13 of the scale can be considered as thin gauges in which the resistance measurement Ri varies linearly with the force exerted on them Fi.

One will note that this calibration mode can be used when the weight M of the user is calculated using any rule (including a non-linear rule) as a function of the measurements from the strain gauges 13.

Initial Association Steps

Before any use of the scale 1 it is necessary to integrate it into the wireless local area network, and also to integrate the mobile terminal 2 into this wireless local area network, at least when the scale 1 and the mobile terminal 2 communicate using solely the wireless local area network.

The integration of the scale 1 into the wireless local area network can occur by association with the platform 4, either in a purely automatic manner or by requiring the user to perform actions on the scale 1 using the button 1b and/or other buttons (not represented) which are part of this scale, such that the scale 1 communicates via WIFI with the platform 4.

After this first association step, the scale 1 communicates with the platform 4 via the wireless local area network, which in turn communicates with the server 6 by means of the Internet 5.

In the same manner, the mobile terminal 2 can enter the wireless local area network by association with the platform 4 in a conventional manner, which allows the mobile terminal to communicate with the platform 4, in WIFI mode in the example considered here.

Figure 3:
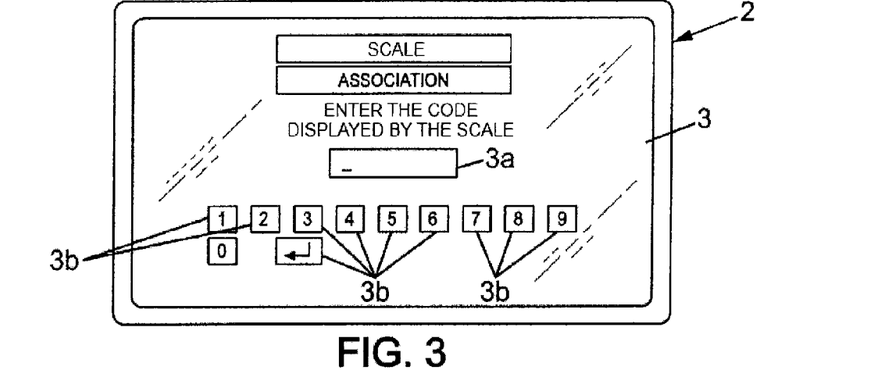
FIG. 3 shows an example of what may be displayed on the screen of the mobile terminal of the weighing device in FIGS. 1 and 2, during an initial association step associating the scale and the mobile terminal.

Additionally or alternatively, the scale 1 can be directly associated with the mobile terminal 2, in a manner which allows them to communicate directly with each other. Advantageously, the following can occur for this purpose:

the user presses on the association button 1b of the scale, in response to activating this button 1b, the CPU 12 of the scale displays a code on its screen 1a, for example a random code, and advantageously a code comprising few characters (for example 4 numbers);

simultaneously, the user U launches a "scale" application on his mobile terminal and selects an "association" option in a menu, which allows him for example to display a screen such as the one represented in FIG. 3, where the user can enter the code displayed on the screen 1a, for example by inputting this code using virtual keys 3b displayed on the touch screen 3, the code entered by the user is transmitted by the mobile terminal 2 to the server 6 directly over the Internet 5, using the UMTS connection or a similar connection of the mobile terminal, the code displayed by the screen 1a of the scale 1 is sent by to the same server 6 by the scale, by means of the platform 4 and of the Internet 5, the server 6 compares the two codes and, if they correspond, gives instructions to the mobile terminal 2 and to the scale 1 to associate in order to communicate with each other on the WIFI wireless local area network.

In this manner, a direct bidirectional communication in WIFI mode is obtained between the scale 1 and the mobile terminal 2.

One will note that the bidirectional communication between the scale 1 and the mobile terminal 2 could be obtained in various other ways in the context of the invention, for example:

by enabling the scale 1 and the mobile terminal 2 to communicate within the wireless local area network, but by means of the platform 4, by enabling the scale and the server 6 to communicate by means of the platform 4 and the Internet 5, and enabling the mobile terminal 2 to communicate with the server 6 over the wide area radio connection (UMTS in the example considered) of the mobile terminal.

Weighing

Each time a user U wants to use the scale 1, he launches the "scale" application on his mobile terminal 2, in order to activate the bidirectional communication between the scale 1 and the mobile terminal 2.

The User U then steps onto the scale 1, represented with solid lines in FIG. 1, after which the scale 1 records the measurements R1-R4 from the strain gauges 13 (in practice, resistance measurements) and body impedance measurements from the impedance sensors 14. From these various measurements, the CPU 12 of the scale determines the weight M of the user by the above formula: $M=\alpha 1 R1 + \alpha 2 R2 + \alpha 3 R3 + \alpha 4 R4$ (in the case considered here where the scale 1 comprises four strain gauges).

To process the impedance measurements from the impedance sensors 14, the CPU 12 of the scale uses predetermined calculation rules which allow obtaining parameters such as the body fat percentage, muscle mass percentage, body water percentage, body mass index, etc. These predetermined rules are generally empirical rules dependent on the user profile, and in particular the gender, age, and height.

The CPU 12 can have a certain number of regular users of the scale 1 in memory, with their user profile and the latest weight measurements. The CPU 12 of the scale can thus automatically recognize the user U currently making use of the scale, based on the measured weight.

Alternatively, the profiles of regular users can be stored on the platform 4 or on the server 6, in which case, the scale 1 will look on one of these devices for the user profile closest to the user U currently making use of the scale 1.

Figure 4:
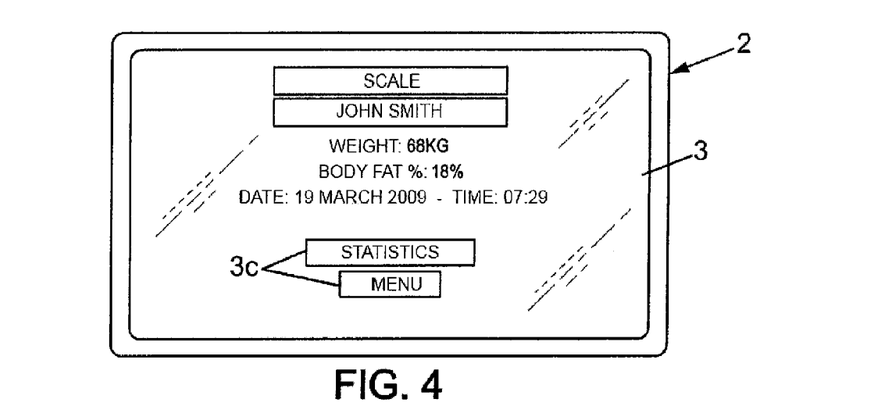
FIG. 4 shows an example of what may be displayed on the screen of the mobile terminal of the weighing device in FIGS. 1 and 2, when weighing a user.

Once it is determined which user profile corresponds to the user U currently making use of the scale 1, the CPU 12 of the scale can use the rule for calculating the bioelectrical impedance data which corresponds to the user profile, and displays a view such as the one in FIG. 4 for example, on the screen 3 of the mobile terminal 2.

In this example, the screen 3 of the mobile terminal shows the name corresponding to the user profile ("John Smith" here), the measured weight (68 kg), at least one bioelectrical impedance parameter calculated during the weighing, for example the fat percentage (18% here), and the date and time of the measurement (the 19th of Mar., 2009 at 7:29 in the morning).

The view displayed on the screen 3 also comprises virtual keys 3c on the touch screen, for example a MENU button providing access to different display options for example (particularly for displaying other bioelectrical impedance data), and a STATISTICS button for accessing statistical data for example, stored for example on the server 6.

The time-stamped weighing data (weight and bioelectrical impedance data) are transferred to the server 6:

either by the scale 1 via the platform 4, or by the mobile terminal 2, via the platform 4 or directly over its wide area radio connection (here the UMTS connection).

Figure 5:
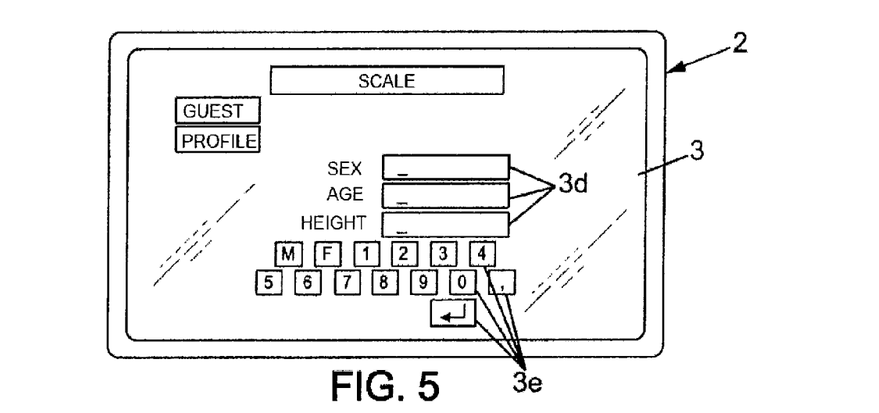
FIG. 5 shows an example of what may be displayed on the screen of the mobile terminal of the weighing device in FIGS. 1 and 2, when entering the user profile for a guest user.

Advantageously, when the "scale" application is launched on the mobile terminal 2, the touch screen 3 of the mobile terminal can display a virtual button "GUEST" which, when activated by the user U, stops the automatic search for a preexisting user profile and displays a screen such as the one represented in FIG. 5, where the user can enter information about his sex, age, and height in three fields 3d, by means of virtual keys 3e displayed on the touch screen 3 of the mobile terminal 2.

Once the user profile of the guest is entered, the bioelectrical impedance data can then be calculated and displayed with the weight of the user on the screen 3 of the mobile terminal, as explained above and as represented in FIG. 4.

One will note that the weighing data can be viewed by the user U on the terminal 2 not only when he is on the scale 1, but also when he is away from it as represented by the dotted lines in FIG. 1. It is possible for the user U to use the scale 1 without his mobile terminal 2, simply by reading the screen 1a of the scale, and then he can view the weighing data transmitted by the scale at a later time on the terminal 2.

Updating the Scale

When the scale 1 is on and is communicating with the platform 4, the server 6 can update the software which operates the scale. Similarly, the server 6 can update the "scale" application running on the mobile terminal 2.

These updates can concern either the code of the software in question, or certain parameters for calculating the weight of the user or bioelectrical impedance data calculated based on impedance measurements.

Thus, the parameters αi for calculating the weight of the user can be updated from time to time as a function of the age of the scale 1, based on statistical data concerning the scales in service, originating for example from data issuing from after-sales service which allow modeling the aging of the strain gauges in the scale 1.

Similarly, in the memory of the CPU 12 of the scale 1, the server 6 can update the calculation rules for determining the bioelectrical impedance data as a function of the impedance measurements as a function of the user profile, these updates occurring for example when scientific advancements are made in said calculation rules.

Also, when the initial scale calibration step is done in the factory, at a site corresponding to an acceleration of gravity having the value g0, it is possible to update the calculation parameters αi of the user's weight as a function of the geographical location of the scale 1.

For this purpose, the server 6 can for example determine the geographic location of the scale 1 using the geolocation functionalities of the Internet 5, for example simply as a function of the IP address of the scale 1. Alternatively, this geolocation can occur using the geolocation functionalities of the wide area radio connection used by the mobile terminal 2, for example if this connection is UMTS.

The server 6 can send to the scale 1 a correcting parameter g/g0 as a function of the geographic location of the scale, where g is the value of the acceleration of gravity at the location of the scale 1, in which case the scale 1 corrects the initial weight calculation parameters αi0 by corrected calculation parameters αi=αi0*g/g0. One can thus obtain more accurate measurements of the weight of the user U using these corrected parameters, in the abovementioned formula M=α1·R1+α1·R2+α3+R3+α4·R4.

Lastly, the internal clock of the scale's CPU 12 can be updated automatically, for example each time the scale is used or at regular time intervals, for example using time updating functionalities available on the communication network with which the scale is communicating, meaning the wireless local area network and/or the Internet 5.

The invention claimed is:

1. A weighing method using an electronic body scale communicating with a mobile telecommunication terminal equipped with a display screen, the scale and the mobile terminal both communicating by Hertzian waves with a telecommunication network, said telecommunication network being adapted to place at least the mobile terminal in communication with at least one supplemental telecommunication device, said method comprising the following steps:

(a) at least one weighing step during which the scale obtains at least one measurement representative of at least the weight of the user, (b) at least one bidirectional communication step, during which:

a user enters data into the mobile terminal, and the mobile terminal transmits said information to the scale by means of the telecommunication network, and the scale transmits weighing data regarding said measurement, to the mobile terminal, over the telecommunication network, (c) and at least one display step during which the mobile terminal displays, on the screen, information regarding the weighing data transmitted in the communication step, wherein the telecommunication network comprises at least one wireless local area network to which the scale belongs, wherein the local area network additionally comprises a platform which communicates with at least the scale, and wherein the scale used comprises a screen, and the method has a preliminary association step during which a code is displayed on the screen of the scale, the user enters said code into an input interface which is part of the mobile terminal, then said code is sent by the scale to the server by means of the platform and the code entered into the input interface is sent by the mobile terminal to said server, after which the server checks if the code received from the scale corresponds to the code received from the mobile terminal, and if there is a correspondence, the server associates the scale with the mobile terminal in the wireless local area network.

2. The method according to claim 1, wherein:

during the weighing step, a bioelectrical impedance measurement is also obtained for the user, and during the communication step, the data entered by the user into the mobile terminal comprise a user profile, and the weighing data transmitted by the scale to the mobile terminal comprise a weight and bioelectrical impedance data regarding the user profile.

3. The method according to claim 2, wherein the user profile comprises the age, height, and gender of the user.

4. The method according to claim 1, wherein said telecommunication network comprises a wide area network, and during the communication step said weighing data are transmitted to the server over said wide area network.

5. The method according to claim 4, comprising at least one updating step during which the server updates software in the scale.

6. The method according to claim 5, wherein the weighing data comprise the user's weight, calculated using at least one user weight calculation parameter based on said measurement representative of the user's weight during the measurement step, and during said updating step, the server determines the geographical location of the scale using geolocation functionalities of the wide area network, and updates said user weight calculation parameter as a function of said geographical location.

7. The method according to claim 1, wherein:

during the communication step, the scale transmits said weighing data regarding said measurement to the mobile terminal, in real time over the telecommunication network, and during the display step, the mobile terminal displays in real time on the screen, while the user is on the scale, said information regarding the weighing data transmitted in the upload communication step.

8. The method according to claim 1, wherein the mobile terminal used is a mobile telephone.

9. The method according to claim, wherein during the communication step the scale transmits said weighing data to the mobile terminal by means of said wireless local area network.

10. The method according to claim 9, wherein during the communication step, the scale transmits said weighing data to the mobile terminal by means of the platform.

11. The method according to claim 1, wherein said telecommunication network additionally comprises a wide area network distinct from the wireless local area network, the platform communicating with at least one server by means of said wide area network, said mobile terminal also communicating with said server by means of the wide area network,
and during the communication step, the scale transmits said weighing data to the mobile terminal by means of said server, over said wide area network.

12. The method according to claim 11, wherein, during the communication step, the server transmits supplemental information to the mobile terminal in addition to said weighing data, over said wide area network.

13. The method according to claim 1, wherein the weighing data comprise the weight of the user, calculated using at least one user weight calculation parameter based on said measurement representative of the user's weight during the measurement step, said measurement representative of the user's weight being obtained by at least one strain gauge which is part of the scale,
and during said updating step, the server updates said user weight calculation parameter as a function of statistical data relating to the scales in service.

14. The method according to claim 1, wherein the weighing data obtained during the measurement step are time-stamped, and the method comprises a time reset step during which an internal clock which is part of the scale is updated using time setting functionalities available on said telecommunication network.

15. A weighing device comprising:
an electronic scale adapted to provide at least one measurement representative of at least the weight of a user positioned on said scale,
a mobile telecommunication terminal equipped with a display screen and an input interface,
a telecommunication network communicating by Hertzian waves with said scale and said mobile terminal and adapted to allow at least the mobile terminal to communicate with at least one supplemental telecommunication device, said telecommunication network comprising at least one wireless local area network to which the scale belongs, said local area network additionally comprising a platform which communicates with at least the scale,
a server communicating with said telecommunication network,
said scale being adapted to transmit weighing data regarding said measurement to the mobile terminal, through said wireless local area network,
and the mobile terminal being adapted to:
transmit to the scale, through said wireless local area network data input into the mobile terminal by the user through said input interface,
and display, on the screen, information regarding the weighing data transmitted by the scale to the mobile terminal through the platform, wherein the scale comprises a screen and is adapted, during preliminary association, to display a code on said screen and to send it to a server,
wherein the mobile terminal is adapted to receive said code from a user through said input interface and to send said code to said server, and wherein the server is adapted to check if the code received from the scale corresponds to the code received from the mobile terminal, and if there is a correspondence, the server is adapted to associate the scale with the mobile terminal in the wireless local area network.

16. The device according to claim 15, wherein the scale is adapted to obtain a bioelectrical impedance measurement for the user, with the weighing data comprising a weight of the user and bioelectrical impedance data,
the mobile terminal being adapted:
to allow the user to enter a user profile
and to transmit this user profile to the scale,
the scale being adapted to determine said bioelectrical impedance data as a function of said user profile.

17. The device according to claim 16, wherein the user profile comprises the age, height, and gender of the user.

18. The device according to claim 15, wherein said telecommunication network comprises a wide area network and the scale is adapted to transmit said weighing data to the server over said wide area network.

19. The weighing device according to claim 15, wherein the mobile terminal used is a mobile telephone.

20. The weighing device according to claim 15, said telecommunication network additionally comprises a wide area network distinct from the wireless local area network, said platform communicating with at least one server through said wide area network, the mobile terminal also communicating with said server by means of the wide area network.

21. A weighing method using an electronic body scale communicating with a mobile telecommunication terminal equipped with a display screen, the scale and the mobile terminal both communicating by Hertzian waves with a telecommunication network, said telecommunication network being adapted to place at least the mobile terminal in communication with at least one supplemental telecommunication device, said method comprising the following steps:
(a) at least one weighing step during which the scale obtains at least one measurement representative of at least the weight of the user,
(b) at least one bidirectional communication step, during which:
a user enters data into the mobile terminal, and the mobile terminal transmits said information to the scale by means of the telecommunication network, and
the scale transmits weighing data regarding said measurement, to the mobile terminal, over the telecommunication network,
(c) and at least one display step during which the mobile terminal displays, on the screen, information regarding the weighing data transmitted in the communication step,
and wherein, during the weighing step, the scale automatically attempts to establish a correspondence between the user and at least one predetermined user profile in order to determine said weighing data using at least one predetermined rule dependent on the user profile,
and during the communication step, if the user is not a regular user of the scale, said user is identified as a guest on the mobile terminal and the scale then stops automatically attempting to establish a correspondence between the user and a predetermined user profile.

22. The method according to claim 21, wherein, if said user is identified as a guest on the mobile terminal, then the mobile terminal asks the user to select a user profile from a preexisting list, and after a user profile is selected this profile is sent to the scale in order to determine said weighing data using at least one predetermined rule dependent on the selected user profile.

23. A weighing method using an electronic body scale communication with a mobile telecommunication terminal equipped with a display screen, the scale and the mobile terminal both communicating by Hertzian waves with a telecommunicating network, said telecommunication network being adapted to place at least the mobile terminal in communication with at least one supplemental telecommunication device, said method comprising the following steps:
  (a) at least one weighing step during which the scale obtains at least one measurement representative of at least the weight of the user,
  (b) at least one bidirectional communication step, during which:
    a user enters data into the mobile terminal, and the mobile terminal transmits said information to the scale by means of the telecommunication network, and
    the scale transmits weighing data regarding said measurement, to the mobile terminal, over the telecommunication network,
  (c) and at least one display step during which the mobile terminal displays, on the screen, information regarding the weighing data transmitted in the communication step,
wherein the weighing data comprise the weight of the user, calculated using at least one user weight calculation parameter based on said measurement representative of the user's weight during the measurement step, said measurement representative of the user's weight being obtained by at least one strain gauge which is part of the scale,
and during said updating step, the server updates said user weight calculation parameter as a function of statistical data relating to the scales in service.

24. A weighing method using an electronic body scale communicating with a mobile telecommunication terminal equipped with a display screen, the scale and the mobile terminal both communicating by Hertzian waves with a telecommunication network, said telecommunication network being adapted to place at least the mobile terminal in communication with at least one supplemental telecommunication device, said method comprising the following steps:
  (a) at least one weighing step during which the scale obtains at least one measurement representative of at least the weight of the user,
  (b) at least one bidirectional communication step, during which:
    a user enters data into the mobile terminal, and the mobile terminal transmits said information to the scale by means of the telecommunication network, and
    the scale transmits weighing data regarding said measurement, to the mobile terminal, over the telecommunication network,
  (c) and at least one display step during which the mobile terminal displays, on the screen, information regarding the weighing data transmitted in the communication step,
wherein the method comprises at least one updating step during which a server updates software in the scale, the server communicating with the scale by means of the telecommunication network, and
wherein the weighing data comprise bioelectrical impedance data calculated from impedance measurements made by the scale, using at least one predetermined calculation rule, and the server updates said calculation rule during said updating step.

25. A weighing method using an electronic body scale communicating with a mobile telecommunication terminal equipped with a display screen, the scale and the mobile terminal both communicating by Hertzian waves with a telecommunication network, said telecommunication network being adapted to place at least the mobile terminal in communication with at least one supplemental telecommunication device, said method comprising the following steps:
  (a) at least one weighing step during which the scale obtains at least one measurement representative of at least the weight of the user,
  (b) at least one bidirectional communication step, during which:
    a user enters data into the mobile terminal, and the mobile terminal transmits said information to the scale by means of the telecommunication network, and
    the scale transmits weighing data regarding said measurement, to the mobile terminal, over the telecommunication network,
  (c) and at least one display step during which the mobile terminal displays, on the screen, information regarding the weighing data transmitted in the communication step,
wherein, during the measurement step, the scale performs a number n of measurements by n strain gauges which are part of said scale, and the weighing data comprise the weight of the user, calculated using a predetermined relation as a function of the n measurements from the strain gauges,
said method comprising a calibration step during which a known weight is successively placed at least n times on the scale in n different respective locations, storing the n measurements from the strain gauges each time, and then said predetermined relation is determined based on the measurements made in this manner.

* * * * *